United States Patent [19]
Jewson

[11] 3,908,598
[45] Sept. 30, 1975

[54] AQUARIUMS

[75] Inventor: Charles H. Jewson, Ashland, Ohio

[73] Assignee: Ashco Ohio Products, Inc., Ashland, Ohio

[22] Filed: Sept. 3, 1974

[21] Appl. No.: 502,693

[52] U.S. Cl................................. 119/5; 240/2 LC
[51] Int. Cl.²....................................... A01K 63/00
[58] Field of Search........ 119/3, 4, 5; 43/17.5, 17.6; 161/18; 240/2 LC

[56] References Cited
UNITED STATES PATENTS
| | | | |
|---|---|---|---|
| 3,563,204 | 2/1971 | Szilagyi.................................. | 119/5 |
| 3,744,454 | 7/1973 | Willinger et al........................ | 119/5 |

FOREIGN PATENTS OR APPLICATIONS
| | | | |
|---|---|---|---|
| 1,006,661 | 4/1957 | Germany............................... | 119/5 |

*Primary Examiner*—Louis G. Mancene
*Assistant Examiner*—Peter K. Skiff
*Attorney, Agent, or Firm*—Gordon C. Mack

[57] ABSTRACT

An aquarium in which usually all of the walls are made of glass. Usually the back of the bottom is usually horizontal and the front portion of the bottom (or a part of the front portion of the bottom) is inclined upwardly at an angle of 10° to 40° and the whole of the bottom may be so inclined. In either case, the front of the bottom will be transparent and lighted from below. The back portion will be covered with sand or the like.

The front of the bottom is transparent and lighted from underneath. The lighting fixture is hidden from view.

As an alternative, both the front and back portions of the bottom may be slanted upward, and the middle of the bottom which comprises parts of both of the slanted portions or a separate flat piece, will be covered with sand or the like. In this case the bottoms of both the front and back walls are made opaque to hide the light source from view. The rest of this disclosure will describe only those aquariums in which only the front portion of the bottom is inclined upward and lighted from below.

6 Claims, 4 Drawing Figures

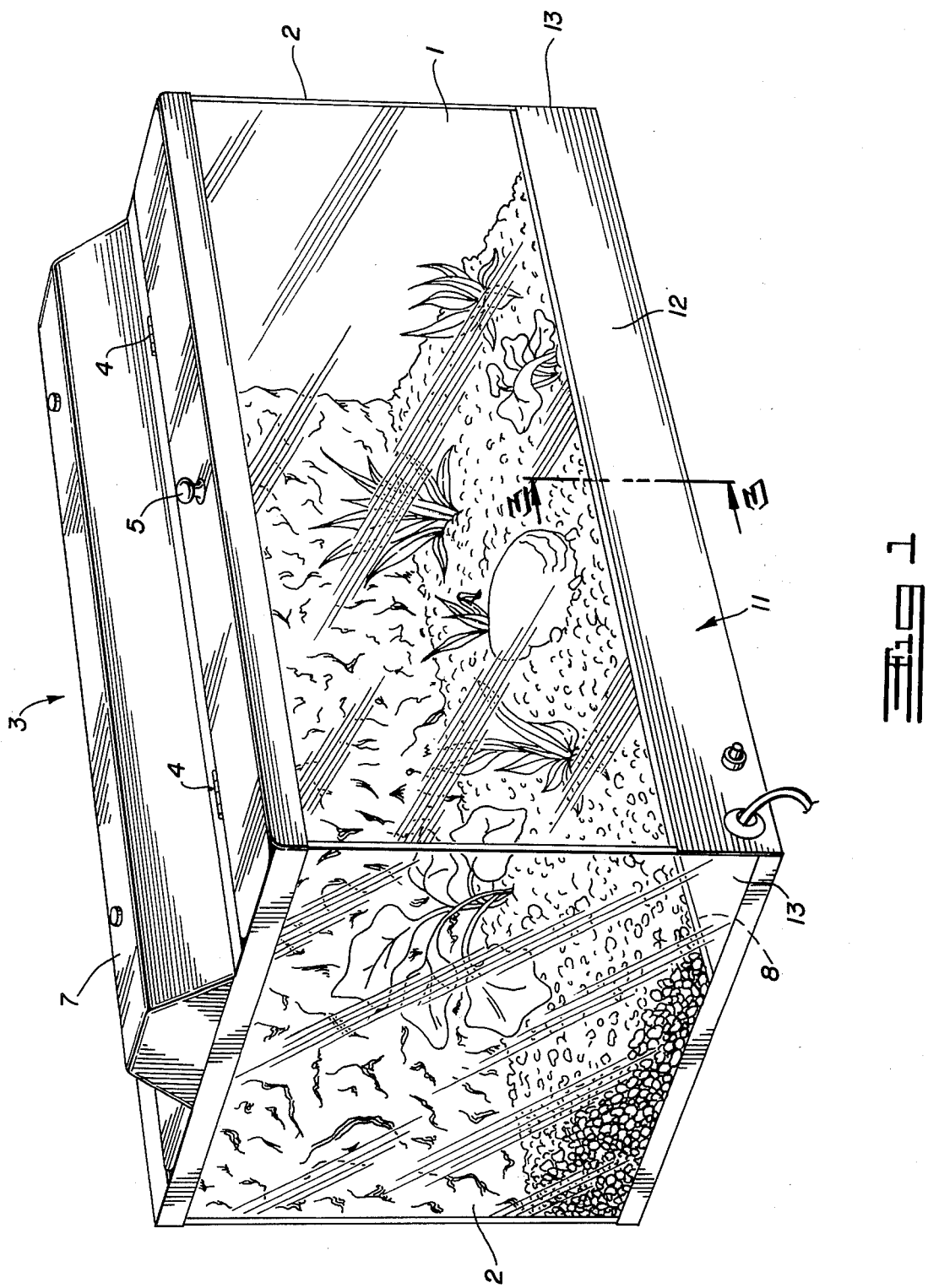

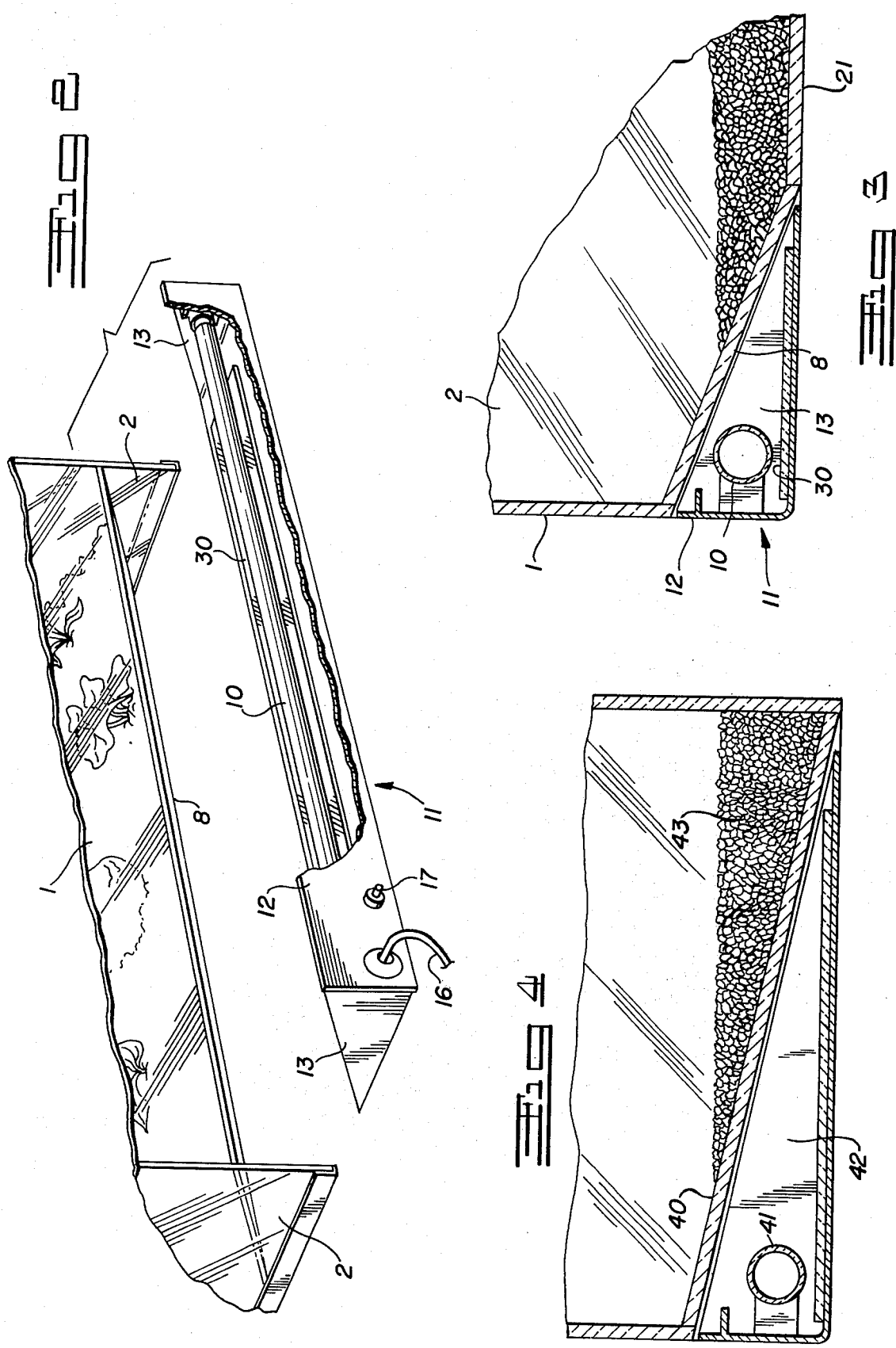

AQUARIUMS

BACKGROUND OF THE INVENTION

The prior art shows various means for lighting aquariums. There is no suggestion of lighting an aquarium through a portion or portions of a transparent, slanting bottom, lighted from below.

SUMMARY OF THE INVENTION

The invention relates to an aquarium for aquatic plant and/or animal life. The walls of the aquarium are usually made of transparent glass or plastic, although this is not necessary. If only the front of the bottom is lighted from below, the back wall may be opaque and reflect the light which enters the aquarium. The top of the aquarium may be open or closed.

By having light come up through the bottom of the aquarium, the contents of the aquarium are illuminated in a very beneficial way. Most fish have reflective scales or skin and light directed at them from this angle is reflected up and out of the aquarium in such a way as to produce a most unusual effect. The aquarium may be lighted solely by this light under the slanted front portion of the bottom, although such light may be supplemented by other lighting means.

The aquarium is constructed with an opaque wall located in front of the light fixture. This wall extends downwardly from the front edge of the slanted bottom and hides the light from observers (unless, of course, they approach near enough the aquarium to look down through the slanted portion). The back of the aquarium may be opaque and decorated with the type of plant life which grows under water.

The ends of the aquarium are usually transparent, but they may be opaque.

The advantages of using a slanting transparent portion of the bottom of the aquarium which is lighted from underneath including the following:

The light source is concealed with relatively little loss of front viewing area and the space required for lighting is minimal.

The light is delivered at such an angle as to light the fish, etc. to the best advantage. It strikes the sides and under portions of the fish and is reflected back up and out of the aquarium toward the viewer to provide a pleasing view not obtainable by the usual lighting arrangements.

The light is readily accessible to illuminate the contents of the aquarium with a minimum loss of light due to reflection from the surface of the water.

The light fixture is readily removable for inspection, replacement and repair.

No electrical parts come in contact with water, vapor or spray.

Fluorescent bulbs with a range of light characteristics may be used under the slanting bottom portion, and may be such as to provide special effects, all with minimum heating.

The use of flat plates for the walls and bottom of the aquarium is advantageous because they lead to economical construction. Such plates are shown in the drawings, but all plates need not necessarily be flat.

Distribution of the light across the length of the bottom as in the preferred arrangement, minimizes the thermal stress on the glass and possibility of breakage is minimized.

The source of the light which shines up through the slanted bottom, may be one or more ordinary electric bulbs or tubes. This is hidden from view by the opaque wall which extends downwardly from the location where the front of the slanting bottom meets the front wall of the aquarium. This opaque wall may merely be a portion of a transparent wall which is covered with opaque material, but ordinarily it will be a separate removable element such as an opaque piece of metal or plastic or the like. There is usually a bottom to the area which confines the light and this may reflect the light upwardly, although this is not necessary. The ends of this portion of the aquarium are usually opaque so that the light does not extend beyond the aquarium wall. The walls of the space which contains the light may be covered entirely or partially with a reflecting surface.

The invention is further described in the accompanying drawings in which:

FIG. 1 is a view in perspective of the aquarium;

FIG. 2 shows a separate compartment containing the light source separated from the portion of the aquarium into which it fits;

FIG. 3 is an enlarged detail of the end of the front lower portion of one end of the aquarium; and FIG. 4 is a section through an aquarium in which the whole of the bottom slants upward toward the front.

The aquarium usually is made with a transparent front wall 1 and transparent end walls 2. The top 3 is usually opaque. Its edges may fit over the four walls, as shown, and the front portion may be hinged at 4 and provided with a knob 5 to facilitate opening, to provide for supplying fish and food to the aquarium or rearranging the contents and for other purposes.

The top may be provided with a raised middle portion 7 under which a tube or bulb is provided to light the contents of the aquarium from above.

In the preferred structure shown in the drawings, the novel upwardly slanting front portion 8 of the bottom, extends the length of the aquarium. The tube 10 or other light source is located within the removable compartment 11 formed with an opaque front 12, and end walls 13 which are usually opaque. The top of this compartment may be open, as shown, or it may be closed with a transparent cover. Current is supplied to the tube 10 by the flexible conduit 16. Switch 17 is provided for turning the current on and off.

The compartment 11 fits snugly between the end walls 2 of the aquarium under the slanted glass bottom 8. The top and bottom edges of this glass 8 may be beveled as shown but that is not essential. Usually, the member 8 will be held in place between the front wall 1 and bottom 21 by adhesive although other means may be employed.

In the preferred arrangement, the bottom portion 8 rises from the remaining bottom portion 21 at an angle of about 10° or 20° to the horizontal or a somewhat larger angle up to perhaps 40° may be used. The angle selected will depend, among other things, upon the height the aquarium is located above the floor. The angle is such as to prevent a usual observer (unless he comes very close or even looks down into the top of the aquarium) from seeing the bottom portion 8. The source of the light is not apparent to one who observes the front of the aquarium at any usual distance. It lights the contents of the aquarium from a different angle than other lighting means and brings out details better than lighting from a different angle. The mirror 30 in the bottom of the compartment 11 assists in reflecting the light up through the portion 8 and adds to the lighting of the contents of the aquarium, although it is not an essential structural element.

As clearly shown in FIG. 3, sand or gravel used to cover the rear of the bottom portion of the aquarium will usually cover no more than a minor portion of the slanted portion 8, Although it might merely come just to the junction of the portion 8 with the bottom 21, usually it will cover the very bottom of the portion 8, as shown.

A very practical modification of the structure is shown in FIG. 4 in which the whole of the bottom slants up toward the front of the aquarium. It is lighted from underneath by a tube 41 which is located in the forwardly removable compartment 42. About the rear half of the bottom is covered with sand 43. Any one viewing this aquarium from the front will see the same unusual lighting described in connection with FIGS. 1 – 3.

In each of the structures shown, the adjoining edges of glass plates used in the aquarium structures may be joined in any usual manner, and the usual features of aquarium structures may be utilized.

Although the aquarium is usually made of glass walls, they may be composed of plastic, and opaque portions of the structure may be made of plastic or glass.

As explained, the front portion of the bottom of the aquariums of this invention are transparent, inclined upwardly and lighted from below. There are various constructions which come within this general idea. As clearly explained herein, the whole of the bottom may be inclined upwardly at a constant level. As suggested herein, if the aquarium is located where it may be viewed from both the front and back, both the front and back portions of the bottom may be transparent, inclined upwardly and lighted from underneath. Other constructions which take advantage of the basic concept of having the front portion transparent, inclined upwardly and lighted from below are possible within the scope of the accompanying claims.

I claim:

1. An aquarium for aquatic animal and/or plant life at least the front wall of which is transparent, at least the front of the bottom is transparent and slants upwardly at an angle of 10° to 40° to the horizontal, a light is located under this slanting portion of the bottom, and the wall in front of the light is opaque.

2. The aquarium of claim 1 which is provided with a cover which includes a light which shines into the aquarium.

3. The aquarium of claim 1 in which any part of the upwardly slanting portion is covered with sand or the like.

4. The aquarium of claim 1 which contains sand or the like which covers the rear portion of the bottom of the aquarium.

5. The aquarium of claim 1 in which the whole of the bottom slants upwardly at an angle of 10° to 40° to the horizontal.

6. The aquarium of claim 1 in which the rear of the bottom is horizontal and is covered with sand or the like.

* * * * *